United States Patent [19]

Cordova et al.

[11] Patent Number: 5,540,504

[45] Date of Patent: Jul. 30, 1996

[54] SHOCK RESISTANT BEARING

[75] Inventors: Jackie Cordova; Richard E. Mills, both of Colorado Springs, Colo.

[73] Assignee: Quantum Corporation, Milpitas, Calif.

[21] Appl. No.: 524,716

[22] Filed: Sep. 7, 1995

[51] Int. Cl.⁶ .................................................. F16C 32/06
[52] U.S. Cl. ........................... 384/100; 384/107; 384/292; 384/378
[58] Field of Search .................................. 384/100, 107, 384/111, 113, 397, 378, 292

[56] References Cited

U.S. PATENT DOCUMENTS

| | | | |
|---|---|---|---|
| 4,254,961 | 3/1981 | Fersht et al. | 384/100 X |
| 4,596,474 | 6/1986 | Van Roemburg | 384/114 |
| 4,655,615 | 3/1987 | Mori | 384/397 X |
| 4,726,693 | 2/1988 | Anderson et al. | 384/114 |
| 4,795,275 | 1/1989 | Titcomb et al. | 384/107 |
| 4,938,611 | 7/1990 | Nil et al. | 384/107 X |
| 5,067,528 | 11/1991 | Titcomb et al. | 141/4 |
| 5,112,142 | 5/1992 | Titcomb et al. | 384/107 |
| 5,127,744 | 7/1992 | White et al. | 384/107 X |
| 5,358,339 | 10/1994 | Konno et al. | 384/113 X |

*Primary Examiner*—Thomas R. Hannon
*Attorney, Agent, or Firm*—David B. Harrison

[57] ABSTRACT

A hydrodynamic bearing journaling a shaft includes a rotatable bushing journaling the shaft and thrust plates on the shaft at opposite ends of the bushing. The bushing is encased in a cylindrical sleeve. Lubricant containing clearance spaces are formed between the shaft, bushing, sleeve, and thrust plates. One or more internal helical passages are formed between the bushing and sleeve and open into the axial ends thereof adjacent to the thrust plates. An internal radial chamber between the bushing and sleeve opens into the helical channel through radial ports for providing lubricant between the journal bearing and the shaft and thrust plates.

8 Claims, 3 Drawing Sheets

SHOCK RESISTANT BEARING

BACKGROUND OF THE INVENTION

1. Field of the Invention

The present invention relates to precision journal bearings for high speed precision drive shafts. More particularly the present invention relates to high speed, internally lubricated, hydrodynamic journal or spindle bearings finding particular but not necessarily exclusive utility for magnetic media drive mechanisms.

2. Description of the Prior Art

Bearings of the character embodying the present invention are disclosed in U.S. Pat. No. 4,795,275, issued Jan. 3, 1989, to F. Titcomb and J. Cordova, for "Hydrodynamic Bearing." Such bearings are also disclosed in U.S. Pat. No. 4,596,474, issued Jun. 24, 1986, to F. Van Roemburg; U.S. Pat. No. 4,726,693, issued Feb. 23, 1988, to J. Anderson and R. Sleger; U.S. Pat. No. 5,067,528, issued Nov. 26, 1991, to F. Titcomb and J. Cordova; and U.S. Pat. No. 5,112,142, issued May 12, 1992, to F. Titcomb and J. Cordova. Such hydrodynamic bearings include a bearing sleeve with an internal journal bushing press fitted therein and in which is journaled a precision shaft, with provision between the shaft and bushing for incorporating lubricants. Thrust bearings are mounted on the shaft on opposite sides of the bushing. Flats are conventionally machined on the exterior surface of the bushing before press or shrink fit assembly into the sleeve to provide axially extending pressure equalizing lubricant passages in the bearing, with ports or passages through the bushing for conducting lubricant to the shaft journaled in the bushing and to the thrust bearings.

OBJECTS OF THE INVENTION

It is the principal object of the present invention to provide an improved hydrodynamic bearing.

More specifically, it is an object of the present invention to provide an improved hydrodynamic bearing having enhanced shock resistance.

It is another object of the present invention to provide an improved hydrodynamic, internally lubricated shaft and journal sleeve bearing structure having enhanced shock resistance, which is readily constructed and assembled, rugged in use, and suitable for high speed equipment such as magnetic media disk drives.

SUMMARY OF THE INVENTION

In accordance with the foregoing objects, the present invention is embodied in a hydrodynamic bearing comprising an outer cylindrical sleeve having a bushing with a smaller inside diameter press or shrink fitted therein and a shaft having journals rotatably journaled in the bushing. A pair of thrust plates are mounted on the shaft and rotatably and sealingly coact with radially extending faces on the smaller diameter portion of the bushing. The clearance spaces between the bushing, shaft journals and thrust plates are filled with a lubricant. The external faces of the thrust plates are exposed to the air. The larger diameter portion of the bushing includes one or more helical axially extending passageways which, with radial ports through the bushing, define a lubricant chamber which retains lubricant in the event of a jar or shock to the bearing.

DESCRIPTION OF THE PREFERRED EMBODIMENT

Figure 1:
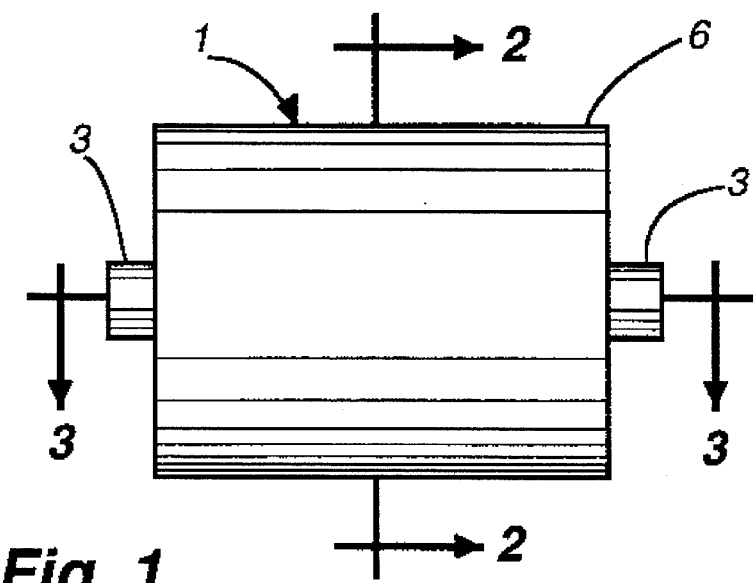
FIG. 1 is an elevation view of a hydrodynamic bearing embodying the present invention.
Figure 2:
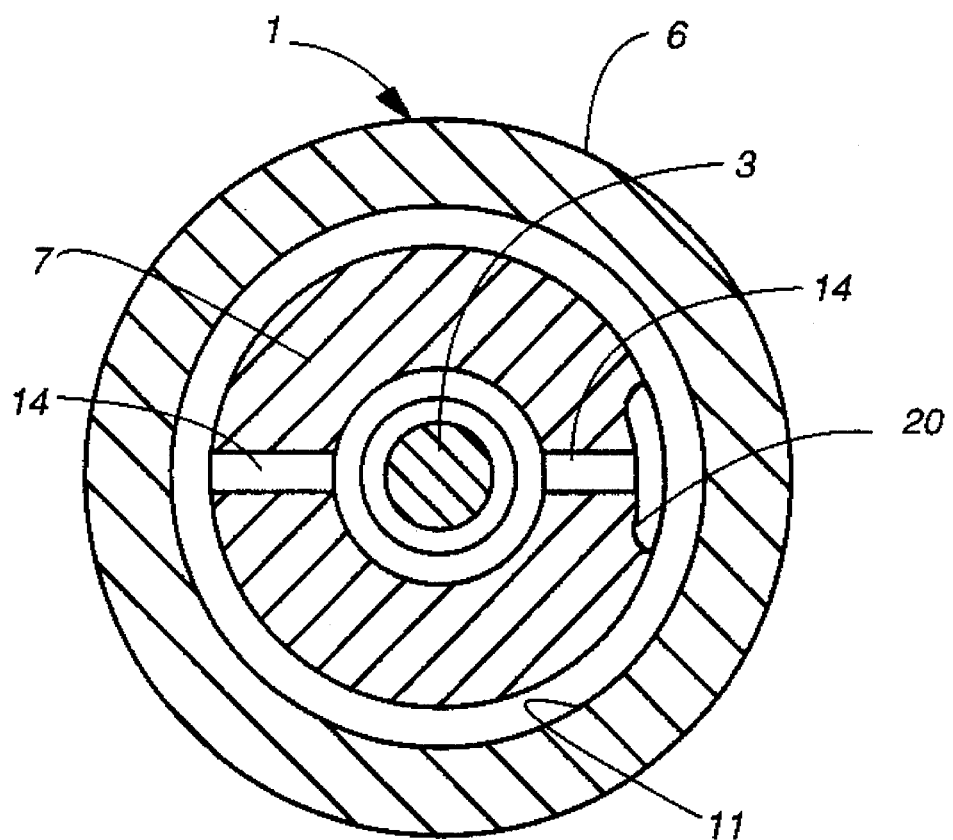
FIG. 2 is a vertical section view taken substantially in the plane of line 2—2 on FIG. 1.

The present invention is embodied in an internally lubricated journal bearing 1 rotatably journaling a shaft 3 having thrust plates 4 supported on opposite ends thereof. The shaft defines spaced spools or journals 5. The thrust plates 4 are mounted on the shaft 3 adjacent to each shaft spool or journal 5. The thrust plates 4 may be press fit onto the shaft 3 to provide a lubricant tight seal therebetween.

The journal bearing 1 is formed by an external sleeve 6 having an internal bushing 7 press or shrink fit mounted therein. The internal bushing 7 defines an inner, axially extending journal bearing surface 8 within which the shaft journals 5 are rotatingly supported or journaled. At its opposite ends, the internal bushing 7 defines radially extending thrust surfaces 9 in opposing relationship with internal radial surfaces 10 on the thrust plates 4.

For lubricant supply within the bearing, an internal lubricant reservoir in the form of an internal circumferential channel 11 is defined in the inner surface 12 of the outer sleeve 6 or optionally on the external surface 13 of the bushing 7. A plurality of radial ports 14 extend from the internal or inner surface 8 of the bushing 7 to the outer surface 13 thereof and open into the lubricant reservoir channel 11 defined in the outer sleeve 6, thereby providing a lubricant passage from the reservoir channel 11 to the shaft journals 5 and inner bushing surface 8.

Lubricant is also contained in a circumferential recess or channel 16 which extends axially between the shaft journals 5. The shaft journals 5 define axially extending circumferential bearing surfaces 17 which operatively coact with the internal surface 8 of the bushing and the lubricant to journal the shaft 3 in the journal bearing bushing 7. Lubricant is contained in the journal bearing structure in the clearance chamber 18 formed and defined between the internal surface 8 of the bushing 7 and the external surface 17 of each shaft journal 5, which chamber 18 includes the shaft recess 16 and the clearance spaces 19 defined between the facing thrust surfaces 9 and 10 of the bushing 7 and thrust plate 4, respectively. Lubricant is supplied to the internal chamber 18 thus defined from the reservoir channel 11 defined in the sleeve, through the radial ports 14 in the bushing 7.

Figure 3:
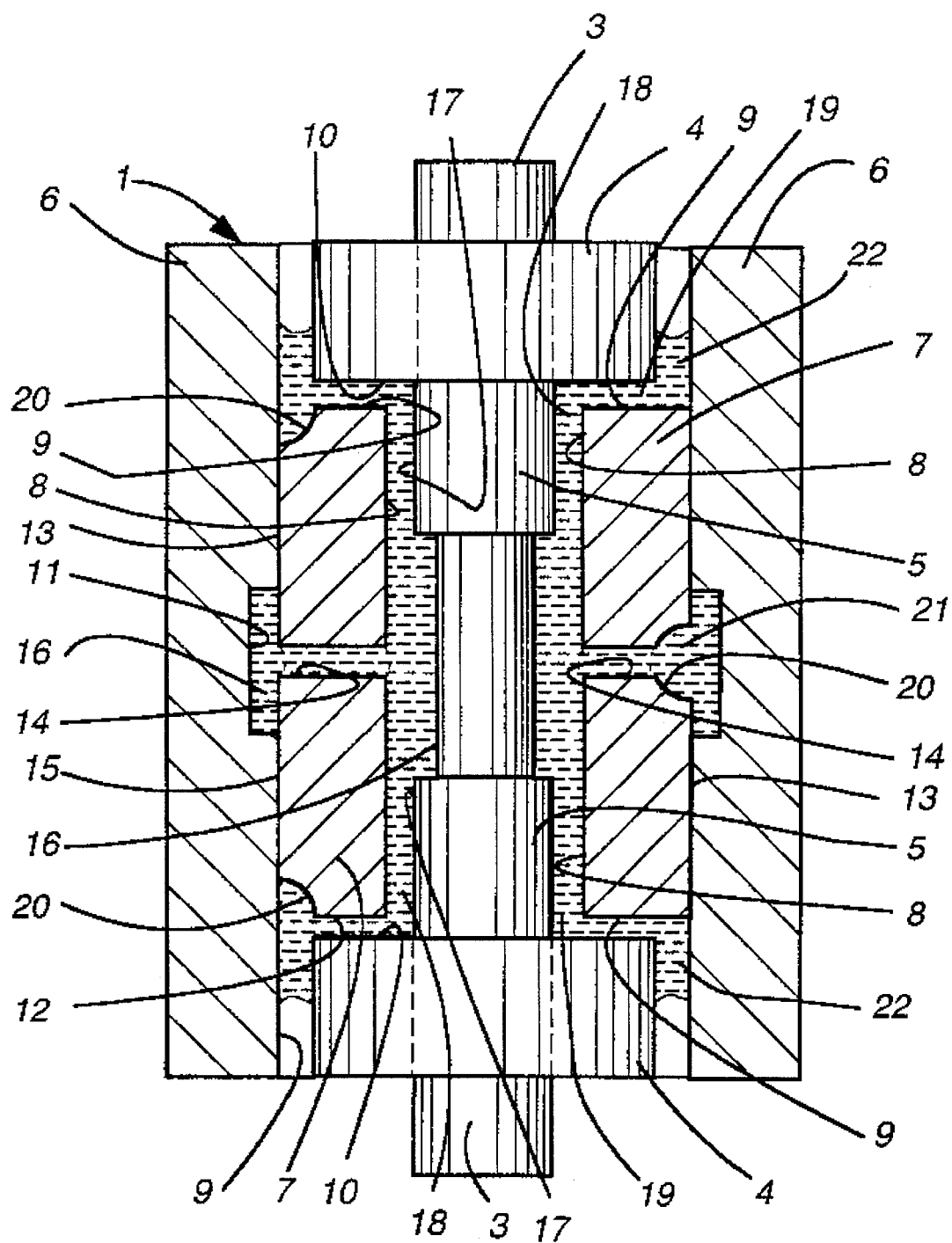
FIG. 3 is a horizontal section view taken substantially in the plane of line 3—3 on FIG. 1.
Figure 4:
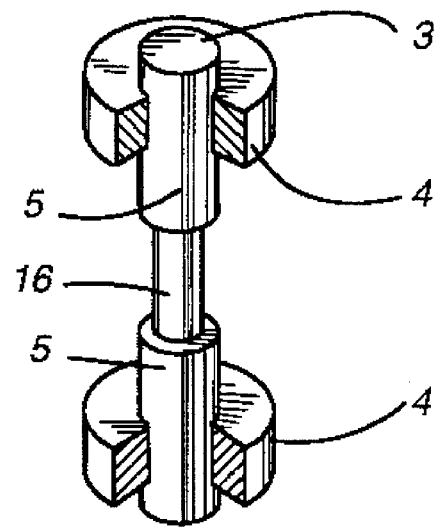
FIG. 4 is a perspective view of a journal bearing embodying the present invention, with parts cut away for clarity.
Figure 5:
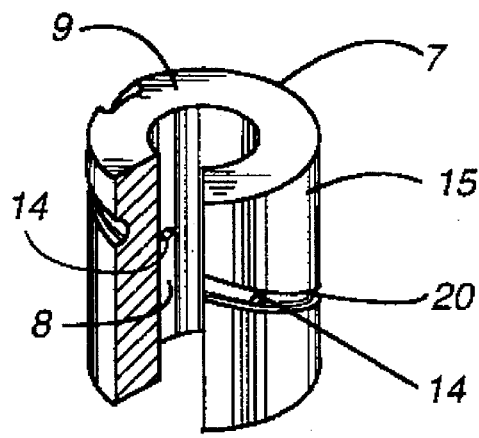
FIG. 5 is a perspective view of a sleeve portion of the bearing shown in FIG. 4 with, parts cut away for clarity.
Figure 6:
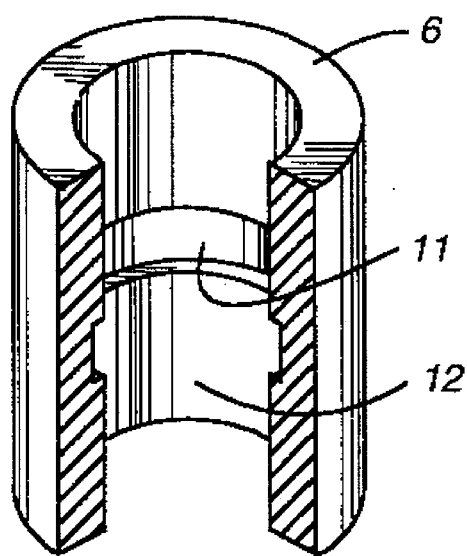
FIG. 6 is a perspective view of a bushing portion of the bearing shown in FIG. 4 with, parts cut away for clarity.

For providing a further lubricant supply to provide an enhanced shock resistance to the bearing structure, the external surface 13 of the bushing 7 defines one or more spiral, helical or zigzag grooves 20 which in turn form a spiral or helical chamber or chambers 21 with the external sleeve 6 when the bushing 7 is press or shrink fitted therein. While it is preferred that the radial ports 14 do not intersect the spiral or helical grooves 20, such ports may if desired intersect one or more of the grooves 20. The grooves 20 may be formed of any configuration, such as triangular, semicircular or rectangular or combinations thereof. The helical grooves 20 open into the end surfaces 9 of the bushing 7 and capillary lubricant seals 22 defined between the sleeve, bushing and thrust plates as shown in FIG. 3, thereby providing lubricant to the spaces between the bushing end surfaces 9 and the radial surfaces 10 of the thrust plates 4. Because of the length and volume of the helical groove or grooves, in the event of a shock or the dropping of the bearing structure, lubricant will be retained in the groove chamber thus formed by the inertia of the fluid in the groove 20. Such a structure provides utility, for example, in a disk drive construction for use in a portable or lap top computer which is subject to relatively rough handling, dropping or shock.

The foregoing structure is produced by forming or machining the spiral or helical or zigzag groove or grooves 20 in the bushing 7 or optionally in the sleeve 6 by an appropriate machining process prior to force or shrink fitting the bushing 7 within the outer sleeve 6, thus facilitating the precision manufacture of the bearing and shaft structure. As a result, a simple yet rugged, internally lubricated journal bearing and shaft mechanism is readily produced.

While a certain illustrative embodiment of the present invention has been shown in the drawings and described above in considerable detail, it should be understood that there is no intention to limit the invention to the specific modification or embodiment disclosed. On the contrary, the intention is to cover all modifications, alternative constructions, equivalents and uses falling within the spirit and scope of the invention as expressed in the appended claims.

We claim:

1. A hydrodynamic bearing for journaling a shaft, comprising a bushing supported in a sleeve and journaling said shaft, thrust plates on said shaft at opposite ends of said bushing, said bushing, shaft and thrust plates defining a clearance space therebetween for containing a lubricant, characterized by an internal helical channel defined between said bushing and said sleeve and opening at the axial ends thereof to the clearance space between said thrust plates and said bushing, and a port through said bushing opening into said helical channel for providing lubricant flow through said journal bearing and said clearance space.

2. A bearing as defined in claim 1 wherein said bushing and sleeve define a plurality of internal helical channels.

3. A hydrodynamic bearing and shaft assembly comprising a cylindrical bushing encased in a cylindrical sleeve, a shaft journaled in said bushing and including a journal having an outer surface forming a first clearance space with respect to the smaller inner surface of said bushing, a pair of thrust plates mounted on said shaft and having thrust surfaces forming second clearance spaces with respect to the radially extending surfaces of said bushing and the inner surface of said thrust plate, the external faces of said thrust plates being exposed to the air, said clearance spaces being filled with a lubricant, said bushing and sleeve defining a helical, axially extending passageway therebetween communicating with said first and second clearance spaces through radial ports defined in said bushing.

4. A bearing as defined in claim 3 further including an interior circumferential channel defined between said bushing and said sleeve, and said radial ports in the bushing connecting said channel to said clearance space between said shaft and said bearing bushing.

5. A bearing as defined in claim 3 wherein said channel is defined in said sleeve.

6. A bearing as defined in claim 3 wherein said channel is defined in said bushing.

7. A bearing as defined in claim 3 wherein said channel is defined in both said sleeve and said bushing.

8. A bearing as defined in claim 3 further comprising a plurality of said helical passageways.

* * * * *